Nov. 10, 1931.  W. T. WINTRINGHAM  1,830,896
ADJUSTABLE ELECTRIC FILTER SYSTEM

Filed Jan. 19, 1928   2 Sheets-Sheet 1

INVENTOR.
W. T. Wintringham
BY
ATTORNEY

Nov. 10, 1931.   W. T. WINTRINGHAM   1,830,896
ADJUSTABLE ELECTRIC FILTER SYSTEM
Filed Jan. 19, 1928   2 Sheets-Sheet 2

INVENTOR.
W. T. Wintringham
BY
ATTORNEY

Patented Nov. 10, 1931

1,830,896

UNITED STATES PATENT OFFICE

WILLIAM T. WINTRINGHAM, OF BROOKLYN, NEW YORK, ASSIGNOR TO AMERICAN TELEPHONE AND TELEGRAPH COMPANY, A CORPORATION OF NEW YORK

ADJUSTABLE ELECTRIC FILTER SYSTEM

Application filed January 19, 1928. Serial No. 247,983.

It is among the objects of my invention to provide new and improved apparatus and a corresponding method for filtering a composite electric current and adjusting the critical or cut-off frequency in this connection. Another object of my invention is to provide a filter with fixed cut-off frequency, and by shifting a frequency range in reference to the said cut-off frequency, to adjust the corresponding frequency at which the initial composite current is effectively cut off. Another object of my invention is to provide for adjusting the point along the frequency scale at which a composite electric current is cut off, by shifting the currents by modulation along the frequency scale before passing them through the filter. Still another object of my invention is to provide for adjusting the cut-off frequency in a filter system by adjusting the frequency of an alternating current generator. All these objects and other objects of my invention will become apparent on consideration of a few examples of the invention which I have chosen for disclosure in the following specification, taken with the appended claims and the accompanying drawings. It will be understood that this specification relates principally to these examples of the invention and that the scope of the invention will be indicated in the claims.

Figure 1:
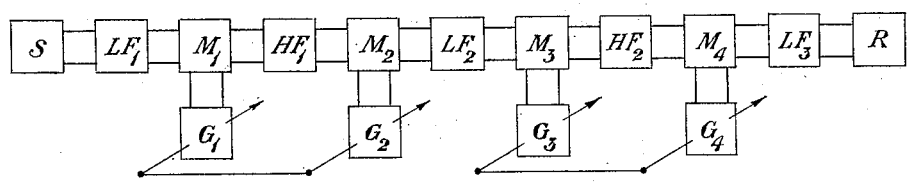
Figure 2:
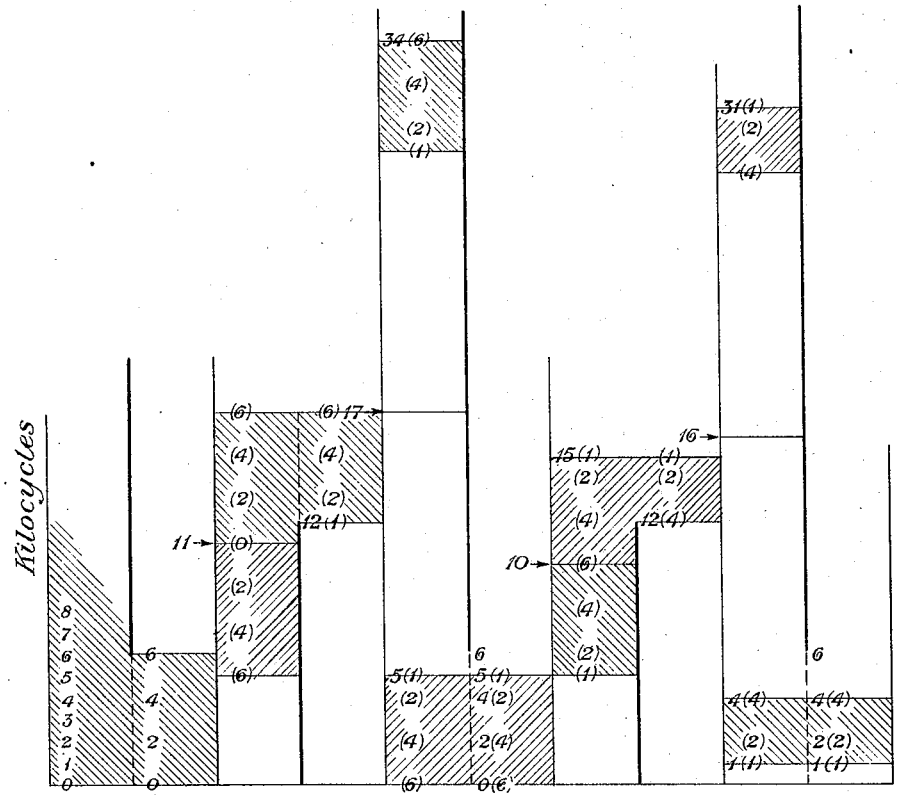
Figure 3:
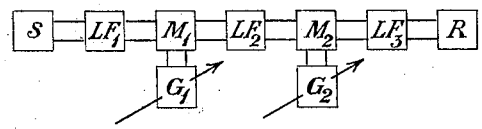
Figure 4:
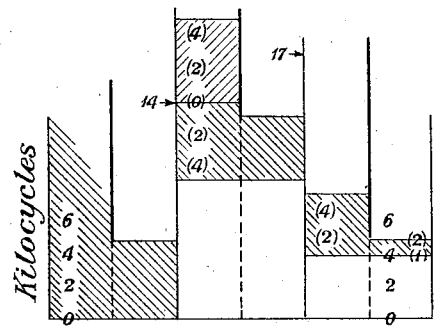
Figure 5:
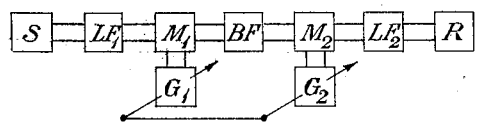
Figure 6:
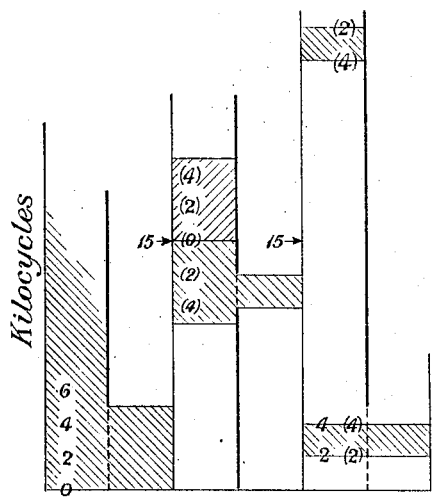

Referring to the drawings, Figure 1 is a symbolic diagram of apparatus that may be employed in the practice of my invention; Fig. 2 is a coordinate diagram that will be used in explanation of the mode of operation of the apparatus of Fig. 1; Figs. 3 and 5 are symbolic diagrams showing modifications as compared with Fig. 1; and Figs. 4 and 6 are coordinate diagrams to accompany Figs. 3 and 5, respectively.

Referring to Fig. 1, a source of composite currents of various frequencies is indicated at S, and at R is a receiver to which certain of the components, according to frequency, are delivered. The intermediate apparatus between the source S and the receiver R is capable of adjustment so that the frequency range delivered to the receiver R shall have such upper and lower limits as may be fixed by the adjustment.

Fig. 2 is a coordinate diagram, the ordinates representing kilocycles and the abscissae representing successive stages traced through the apparatus in Fig. 1 from left to right. Numerals in Fig. 2 not in parentheses represent frequencies in kilocycles at the corresponding levels of the diagram. Numerals in parentheses represent displaced frequencies referred back to the original scale of frequencies in the source S. The construction and mode of operation of the apparatus of Fig. 1 will now be followed through from the source S to the receiver R with reference to Figs. 1 and 2.

The current components from the source S range in frequency from 0 kc. up to frequencies considerably more than 6 kc. Of this range, frequencies from 0 to 6 kc. are passed by the low pass filter $LF_1$. The modulator $M_1$ is supplied with a basic current of frequency 11 kc. from the generator $G_1$, and this current is modulated by the composite current of range from 0 to 6 kc. Accordingly, the modulator output comprises the two sidebands from 11 down to 5 kc. and from 11 up to 17 kc. This output goes to the high pass filter $HF_1$ whose cut-off frequency is at 12 kc., and which accordingly passes a band from 12 to 17 kc. corresponding in order to the frequencies from 1 to 6 kc. in the original frequency range in the source S.

The modulator $M_2$ is supplied from the generator $G_2$ with a basic current of frequency 17 kc. which is modulated by the output from the high pass filter $HF_1$. Accordingly, the output from the modulator $M_2$ comprises the two sidebands, one ranging from 5 kc. down to 0 and the other from 29 kc. up to 34 kc. The low pass filter $LF_2$ with critical frequency at 6 kc. cuts off the upper of these two sidebands and passes the part of the lower from 0 to 5 kc., which corresponds in inverted order with 6 to 1 kc. of the original frequency range in the source S.

The modulator $M_3$ is supplied with basic current of frequency 10 kc. from the generator $G_3$, and this is modulated by the range from the low pass filter $LF_2$ so that the output from the modulator $M_3$ comprises the two ranges from 10 down to 5 kc. and from 10 up to 15 kc. These ranges are applied on the input side of the high pass filter $HF_2$ whose cut-off frequency is at 12 kc. Accordingly, the components passed by the high pass filter $HF_2$ range in frequency from 12 to 15 kc., corresponding to the range from 4 to 1 kc. in the source S.

Again, the modulator $M_4$ is supplied with basic current of frequency 16 kc. from the generator $G_4$, and this current is modulated by the range of 12 to 15 kc. in the output from the high pass filter $HF_2$. Accordingly, the output from the modulator $M_4$ comprises the two sidebands from 4 down to 1 kc. and from 28 up to 31 kc. The low pass filter $LF_3$, with cut-off at 6 kc., suppresses the upper sideband but passes the lower sideband to the receiver R.

Comparing the current range to the receiver R with that going through the low pass filter $LF_1$ from the source S, it will be seen that the initial range from 0 to 6 kc. has been trimmed below and above; the range from 0 to 1 kc. trimmed from below, and the range from 4 to 6 kc. being trimmed from above. The range delivered to the receiver R is found at the same part of the frequency scale as the range from which it is derived in the source S.

In the system as disclosed in Fig. 1, there are low pass filters $LF_1$, $LF_2$, and $LF_3$, all alike, each with cut off at 6 kc.; and there are two high pass filters $HF_1$ and $HF_2$, alike, and cut off at 12 kc. The two generators $G_1$ and $G_2$ are adjustable as to frequency, and adjustable together as indicated by the symbols in Fig. 1, so that $G_2$ will always be 6 kc. higher than $G_1$. Similarly, the two generators $G_3$ and $G_4$ are adjustable as to frequency and are linked so that the frequency in $G_4$ will always be 6 kc. higher than in $G_3$.

With the generators $G_1$ and $G_2$ adjusted, respectively, at 11 and 17 kc., the frequency range passed by the filter $HF_1$ is the part that corresponds to the range from 1 kc. to 6 kc. in the source S. But if these frequencies are adjusted, say, down to 10 and 16, respectively, it will lower the frequencies of the currents relatively to the cut-off point of 12 cycles in the high pass filter $HF_1$ and the range passed thereby will be from 12 to 16 kc., corresponding to 2 to 6 kc. in the original source. Simultaneous adjustment of both modulators $M_1$ and $M_2$ insures that at each adjustment the range of the lower sideband from modulator $M_2$ will be from a certain frequency down to zero, and that the frequency at zero will correspond with 6 kc. in the source S. Hence to this point the original range passed by the low pass filter $LF_1$ has been trimmed by a desired adjustable sub-range from 0 part way to 6 kc. and thereafter inverted, as delivered from the modulator $M_2$.

A glance at the part of Fig. 2 below the high pass filter $HF_2$ shows that if the frequencies of the generators $G_3$ and $G_4$ are adjusted up or down, the band passed will be wider or narrower and that the part cut off will be the part corresponding to the upper part of the initial range from 0 to 6 kc. in the source S. Whereas by adjustment of the frequencies of generators $G_1$ and $G_2$, the part corresponding to the lower edge of the initial range was trimmed as desired, now by adjustment of the frequencies of the generators $G_3$ and $G_4$ the part corresponding to the upper end of the initial range from 0 to 6 kc. is trimmed as desired.

The range from the high pass filter $HF_2$ has now been trimmed to the desired width and the function of the remaining generator $G_4$ is simply to displace and invert the frequency range on the input side so as to give an output corresponding in its location on the frequency scale to the desired selected components in the current from the source S.

It will be seen that the system of Fig. 1 operates as a band pass filter with both its upper and lower cut-off frequencies independently adjustable so that the band of frequencies passed ultimately may be adjusted to any width and any location on the frequency scale within limits set by the design of the apparatus.

For certain purposes it may not be deemed necessary to have as much flexibility of adjustment as here provided. Figs. 3 and 4 relate to a modification in which it is desired to separate out for study a narrow sub-band of frequencies from a wider band but it is not desired necessarily to get the ultimate output at the same level on the frequency scale as the level from which it is taken in the source. More particularly in this case it may be desired to study a certain range from 0 to 5 kc. for the quantity of noise in each narrow band of, say 1 kc. width into which the range from 0 to 5 kc. may be divided. Here only two modulators $M_1$ and $M_2$ are required with their corresponding independently adjustable generators $G_1$ and $G_2$, and only three filters, of low pass variety, two cutting off alike at 5 kc. and one at 13 kc.

From the source S in Fig. 3 currents from 0 to 5 kc. go through the low pass filter $LF_1$ to the modulator $M_1$ where they modulate a basic current of 14 kc., giving two sidebands in the output from 14 down to 9 kc. and from 14 up to 19 kc. The low pass filter $LF_2$ passes only that part of the lower sideband from 13 down to 9 kc. corresponding to the part of the initial range from 1 to 5 kc. This passed range of output current from low pass filter $LF_2$ is applied to modulator $M_2$ to modulate a basic current of 17 kc. from the generator $G_2$, and accordingly, in the output from modulator $M_2$ to low pass filter $LF_3$ there is a lower sideband from 8 down to 4 kc. and an upper sideband (not shown in Fig. 4) from 26 up to 30 kc. Only the part of the lower sideband from 4 to 5 kc. is passed by the low pass filter $LF_3$; this corresponds to the part from 1 to 2 kc. from the source S. For such a study of noise as has been mentioned, this range delivered from low pass filter $LF_3$ to receiver R may be employed with the same advantage as if it were at its original level in the frequency scale, instead of being displaced up 3 kc. as is the case at the right of Fig. 4.

Again, in some cases the desired adjustment may be as to the level at which a subband is selected, keeping the band of unchanged width. A system that fulfills this requirement is shown in Fig. 5 where only two modulators are employed and their generators are adjustable together to hold like frequencies in both. There are also in this system two low pass filters, alike, and both cutting off at 5 kc., and a single band pass filter with fixed cut-off frequencies at 11 and 13 kc.

It will be seen that the range from 0 to 5 kc. is passed from the source S through the low pass filter $LF_1$ and applied to modulate the basic current of 15 kc. in the modulator $M_1$ whose output accordingly comprises an upper side-band and the lower sideband from 15 down to 10 kc. The part of this lower sideband passed through the band filter BF is adjustable by adjusting the frequencies up or down for the generators $G_1$ and $G_2$. As shown in Fig. 6, the part that corresponds to 2 to 4 kc. in the source S is the part passed by the band filter BF. As will readily be apparent, the modulator $M_2$ displaces and inverts this range so that it is restored to its normal original position on the frequency scale and delivered through the low pass filter $LF_2$ to the receiver R. If the location on the frequency scale were immaterial, as was stated to be the case for Figs. 3 and 4, the modulator $M_2$ and the low pass filter $LF_3$ would be unnecessary.

It will be seen that I have provided a system and a method of operation by which one may, in effect, select currents of a desired frequency range from components of wider range, with adjustment of this selection to any desired limiting frequencies within the limits of design of the apparatus employed.

I claim:

1. The method of filtering a composite current with effective adjustment of a cut-off frequency, which consists in shifting the said composite current to a new range by adjusting the frequency difference between the new range and the old one and filtering thereafter at a fixed cut-off frequency intermediate to said new range.

2. The method which consists in shifting a composite current to a new frequency range by a certain frequency difference, then filtering with a fixed cut-off frequency, and adjusting the effective cut-off frequency relatively to the initial range by adjusting the said frequency difference so as to bring the new frequency range to a relation with said fixed cut off frequency where the latter will be at the desired proper intermediate value.

3. In filtering a composite current with a fixed filter cut off frequency, the method of adjustment of the cut-off frequency which comprises modulating the current with a current of single definite frequency and varying the said last mentioned frequency to bring a desired proper intermediate frequency of the modulator output range to the value of the filter cut off frequency and thereby effect the adjustment desired.

4. The method of filtering a composite current with adjustment of a cut-off frequency, which comprises generating a current of a certain definite frequency, modulating it by the initial composite current, filtering with a fixed cut-off frequency, and adjusting the frequency of the said generated current whereby the modulated current is shifted in range relatively to the fixed filter cut-off frequency so as to bring an intermediate frequency of the range of the said modulated current to the desired proper value of the said cut off frequency.

5. The method of adjusting the effective cut-off frequency of a filtered composite current of various frequencies, which consists in generating a carrier current, modulating it by said composite current, filtering at a fixed cut-off frequency, and adjusting the frequency of said carrier current and thereby cutting off the modulated current at a frequency corresponding to the desired intermediate frequency in the said composite current.

6. The method of filtering out a desired frequency band from a composite current with adjustment of a cut-off frequency, which consists in generating a carrier current, modulating it by the initial composite current, filtering with a fixed cut-off, adjusting the frequency of the carrier current to vary the range relatively to the filter cut-off frequency, generating another carrier current and modulating it by the filtered current and thereby getting currents of desired frequency at the location on the frequency scale corresponding to the desired components in the initial composite current.

7. In combination, a source of composite current, a receiver, a filter with fixed cut-off frequency between them, means to shift the frequency range of the composite current on the input side of said filter by an adjustable frequency difference, and means on the output side of said filter to shift the range for the currents passed by the filter, whereby a partial frequency range of components from the source will be delivered to the receiver at their proper place in the frequency scale.

8. An adjustable filter system between a source of current of mixed frequency components and a receiver, comprising a modulator with its input connected to said source, a generator of carrier current adjustable as to frequency for said modulator so as to bring the modulator output range to have a desired proper intermediate frequency thereof at a certain value, and a filter with its cut-off at that value to receive the modulator output and pass a part thereof to said receiver.

9. An adjustable filter system comprising a source of current of mixed frequency, a modulator to receive current from said source, a generator of a definite frequency for said modulator, means to adjust the frequency of said generator so that an intermediate value of the frequency range of the modulator output shall have a certain value, a filter with fixed cut-off frequency at that value to which the modulator output is delivered, and a receiver connected on the output side of said filter.

10. An adjustable filter system comprising a source of current of mixed frequency, a modulator to receive current from said source, a generator of a definite frequency for said modulator, means to adjust the frequency of said generator, a filter with fixed cut-off frequency to which the modulator output is delivered, another modulator to which the filter output is applied, a generator of definite frequency for said last-mentioned modulator, means to adjust this frequency, and another filter through which the output from the last-mentioned modulator output is passed to the said receiver.

In testimony whereof, I have signed my name to this specification this 18th day of January, 1928.

WILLIAM T. WINTRINGHAM.